Nov. 20, 1923.　　　　　　　　　　　　　　　　　　　1,475,066
A. T. GREGORY
MICROMETER GAUGE
Filed Feb. 5, 1921　　　　　　　　2 Sheets-Sheet 1
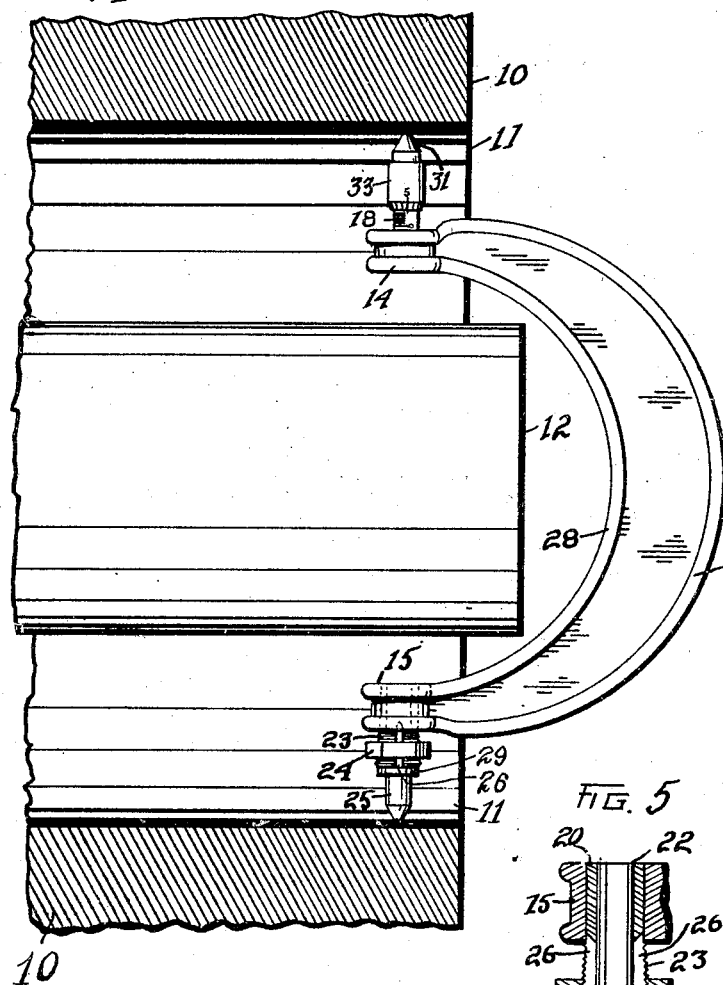
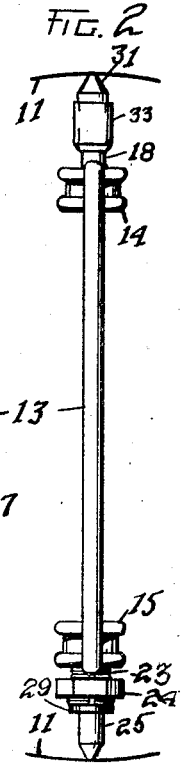
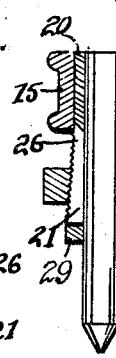
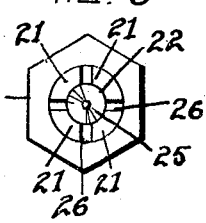
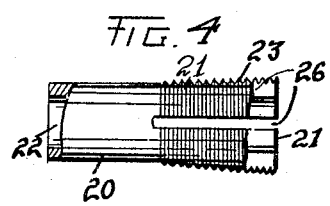
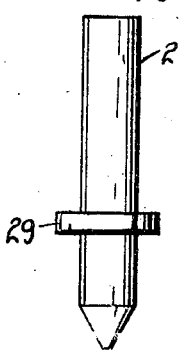
Inventor
Anthony T. Gregory
By S. Arthur Baldwin
Attorney Nov. 20, 1923.	1,475,066
A. T. GREGORY
MICROMETER GAUGE
Filed Feb. 5, 1921	2 Sheets-Sheet 2
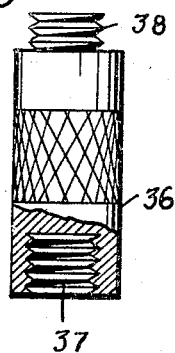
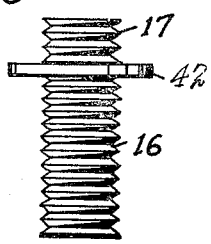
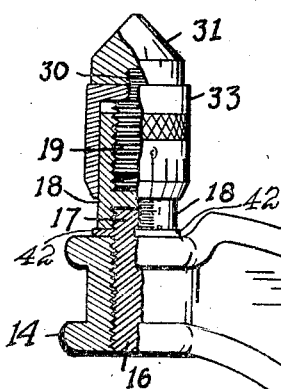
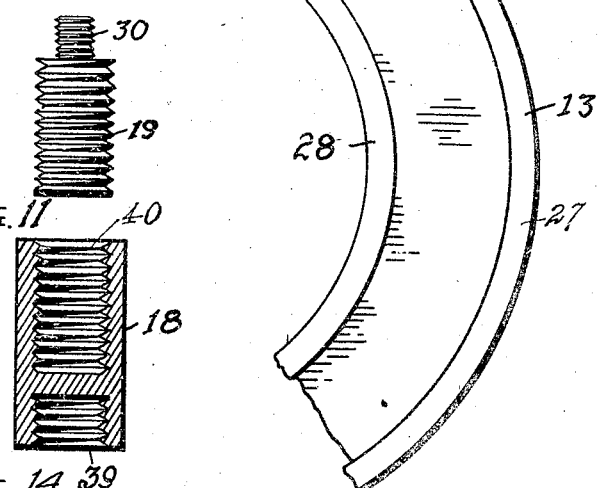
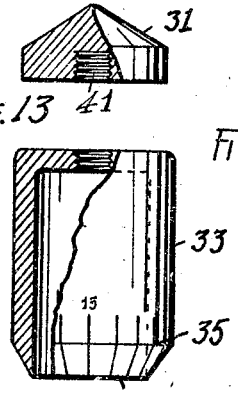
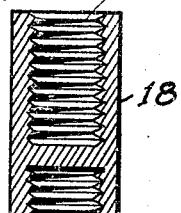
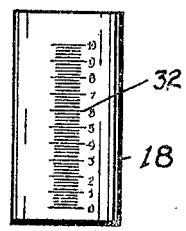
Inventor
Anthony T. Gregory
By S. Arthur Baldwin
Attorney Patented Nov. 20, 1923.

1,475,066

UNITED STATES PATENT OFFICE.

ANTHONY T. GREGORY, OF GROVE CITY, PENNSYLVANIA.

MICROMETER GAUGE.

Application filed February 5, 1921. Serial No. 442,683.

*To all whom it may concern:*

Be it known that I, ANTHONY T. GREGORY, a citizen of the United States, residing at the town of Grove City, in the county of Mercer and State of Pennsylvania, have invented certain new and useful Improvements in Micrometer Gauges, of which the following, taken in connection with the accompanying drawings, is a specification.

The invention relates to inside caliper gauge construction; and the object of the improvement is to provide a simple and easily adjustable inside micrometer or caliper gauge, particularly for large bores or tubing, which is so arranged as to be extensible and surround the boring shaft to measure the diameter of the bore without removing the work piece from the machine and is quickly adjustable to different size bores, holding quite rigidly to the adjusted measuring position; and the invention consists in the novel features and combinations hereinafter set forth and claimed.

In the drawings, Figure 1 is an elevation of the improved micrometer gauge within the end of a bore and extending around the boring shaft, the work piece with its bore being shown in section; and Fig. 2 is a side elevation of the micrometer gauge. Fig. 3 is an elevation of the flanged gauge point or pin removed from the clamping chuck. Fig. 4 is a side elevation of the tubular slotted clamping jaw piece of the chuck end of the micrometer gauge removed from the tool, a portion being shown in section and portions of two of the jaws broken away to show the general construction and arrangement of the same; and Fig. 5 is a diametral sectional view of the chuck with the gauge point or pin clamped therein, the remainder of the micrometer gauge being broken away; and Fig. 6 is an elvation of the end of the clamping chuck with the gauge point or pin therein. Fig. 7 is an elevation of a portion of the gauge showing the assembled micrometer measurement end of the gauge attached to the handle, a portion of said end being shown in section to reveal the construction and arrangement of the same, the clamping chuck end of the gauge being broken away. Fig. 8 is an elevation of the threaded stud by means of which the micrometer measuring end of the gauge is attached to the handle. Fig. 9 is an elevation partly in section of an extension of the micrometer gauge end by which the gauge can be lengthened to a larger size pipe. Fig. 10 is an elevation of the micrometer adjusting screw for insertion in the end of the barrel; and Fig. 11 is a vertical sectional view of the barrel within which said micrometer adjusting screw is inserted. Fig. 12 is an elevation of the cap which forms the gauging face of the head and is attachable on the end of the micrometer screw. Fig. 13 is an elevation partly in section of the thimble which has the beveled inner end with the spaced measurements thereon; and Fig. 14 is an elevation of the barrel which has the micrometer measurements thereon which are used in conjunction with the measurements on the lower end of the thimble.

Like characters of reference refer to corresponding parts in the several views.

The numeral 10 designates the work piece which has the bore 11, and the numeral 12 designates the boring shaft or bar.

The inside caliper consists of the preferably crescent or U-shaped rigid handle piece 13 which has the strong circular ends or jaws 14 and 15 with holes therethrough in alinement with one another.

The end 14 of the handle 13 has the threaded screw stud 16 attached therein. The screw stud 16 has the threaded portion 17 which extends outwardly from said end 14 to receive thereon the barrel 18 in a threaded opening 39 in the same. The barrel 18 has the threaded opening 40 in the opposite end to receive therein the screw 19 which has the finely threaded outer end 30 for the adjustable attachment of the pointed cap 31 thereon.

The opposite jaw end 15 has an opening therethrough to receive the tubular chuck piece 20 with its tapered clamping jaws 21 formed by slotting the exposed portion of the chuck piece 20 preferably by right angle cuts 26 so as to form four strong jaws which are tapered to enlarge or thicken outwardly, the internal bore 22 remaining the same. The chuck member 20 may be secured in any suitable manner to the jaw 15, such as for example by welding. The outer sides 23 of the jaws 21 are threaded to receive the threaded nut 24 around the same to thereby press said jaws inwardly to clamp the gauge point 25 in fixed and adjusted position within said chuck piece 20. Said gauge point 25 may also have an annular flange or ring 29 around the same to prevent vertical movement thereof.

The sleeve or thimble 18 has the micrometer graduations 32 on the outer side thereof, and the thimble 33 screws onto the screw end 30 and receives the barrel 18 therein. The lower end 34 of the thimble 33 is preferably beveled and has spaced graduations thereon so that by turning the thimble 33 and cap 31 on the screw 30, a measurement of micrometer exactness is obtained between the gauge points 25 and 31 by means of the graduations 35 on the thimble 33 and the graduations 32 on the barrel 18. The thread of the screw 30 is preferably made of fine micrometer exactness so as to render the gauge measurements as accurate as possible.

In Fig. 9 is shown an extension piece having a threaded opening 37 in one end to be screwed onto the threaded end 17 of the screw stud 16, thereby enlarging the scope of the measuring tool so as to gauge larger size pipes, as for example, the gauge may be made to measure a fourteen or fifteen-inch bore as normally constructed, and the addition of the extension 36 enlarges the gauge so that it will measure from sixteen to seventeen-inch, or even larger bores. The opposite end of the extension 36 has the threaded end 38 similar to the threaded end 17 which receives the threaded opening 39 thereon in attaching the barrel 18 of the micrometer end of the gauge. The threaded opening 40 receives the screw 19 therein as hereinbefore described, thereby providing the threaded outer end 30 which is received in the threaded opening 41 in the pointed cap 31.

The screw plug 16 has the preferably integral annular flange 42 extending around the same which fits firmly against the outer side of the end 14 of the handle 13, thereby preventing movement of the micrometer end from the adjusted position upon the stud 16. In a similar manner the annular flange or ring 29 around the gauge point 25 holds said gauge point firmly in position so that it cannot be moved inward through the clamping chuck jaws 21, said flange 29 holding firmly against the ends of the jaws 21 as shown in section in Fig. 5.

The boring shaft or bar 12 is of sufficient strength and stiffness to accomplish its purpose, yet leaves a sufficient space around the same for the quick insertion and adjustment of the caliper between said boring shaft 12 and the inner periphery of the bore 11 on each side of the shaft 12, the cap 31 and barrel 33 giving the measurement with micrometer exactness.

The handle portion 13 is made of a material and design which combines lightness with stiffness and strength so that the jaws 14 and 15 will not be sprung in making measurements. To this end the outer and inner edges are preferably ribbed as shown at 27 and 28, thereby also providing a convenient finger hold for the operator in holding the tool and placing the same within the bore 11.

What is claimed is:

1. In a caliper gauge, a substantially U-shaped frame, a work engaging member carried by one end of the frame, a barrel carried by the opposite end of the frame, said barrel being interiorly threaded, a screw threaded into engagement with said barrel threads and having a threaded reduced outer end, a thimble perforated to receive the reduced outer end of the screw, the barrel and thimble having cooperating graduations, and a cap threaded onto the reduced outer end of the screw to hold the thimble upon the screw, the cap being located in alinement with the work engaging member.

2. In a caliper gauge, a substantially U-shaped frame, a work engaging member carried by one end of the frame, a threaded stud secured to the opposite end of the frame, an interiorly threaded barrel threadedly connected to the stud, a thimble mounted over the outer end of the barrel, a screw engaged with the barrel threads and with the thimble, and a cap connecting the thimble to the screw, the cap being alined with the work engaging member, said barrel and thimble having cooperating graduations.

3. An inside caliper comprising a handle curved to extend around a boring shaft and having its ends parallel with one another, a gauge pin, means to adjustably hold said pin in one of said ends of said handle to extend outwardly therefrom, a screw stud in the opposite end, an interiorly threaded barrel attached at one end on said screw stud, a micrometer screw attached in the opposite threaded end of said barrel, a thimble having a threaded opening in the end thereof receivable onto said micrometer screw, and a pointed cap on said micrometer screw, said thimble and said barrel having cooperating graduations by which to adjust said thimble and cap with micrometer exactness.

4. An inside caliper comprising a crescent-shaped handle having ribs on the outer and inner edges thereof and ends in parallelism with one another, said ends being enlarged and having alined holes therethrough, a clamping chuck in one of said holes, a gauge pin slidingly held in said chuck, a screw stud in the hole of the opposite handle end, a threaded barrel attached on said screw stud and having spaced graduations thereon, a micrometer screw attached in the opposite threaded end of said barrel, a thimble having a threaded opening in the end thereof to be received onto said micrometer screw, the opposite end of said thimble being beveled and having spaced graduations around said beveled end, to cooperate with the graduations on said barrel and a pointed cap on said micrometer screw to be adjusted with said thimble..

In testimony whereof I have affixed my signature in the presence of two witnesses.

ANTHONY T. GREGORY.

Witnesses:
CORINNE V. SWANSON,
THEO. THOMAS HAAG.